April 7, 1931. K. DAVIS 1,799,289
MECHANISM AND METHOD FOR SEPARATING INTERMIXED DIVIDED MATERIALS
Original Filed March 30, 1923 3 Sheets-Sheet 1
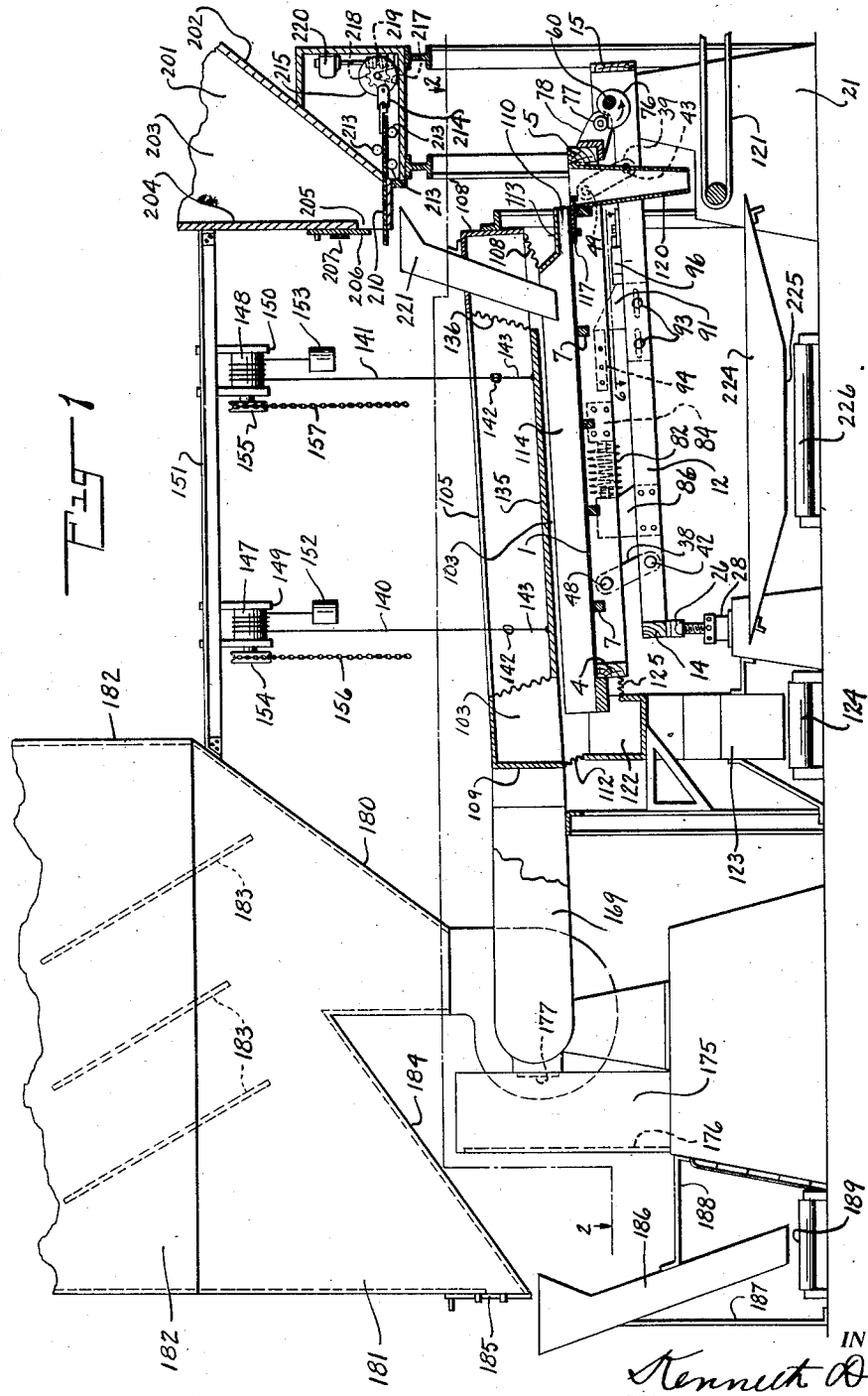
INVENTOR
Kenneth Davis
BY John D Morgan
ATTORNEY

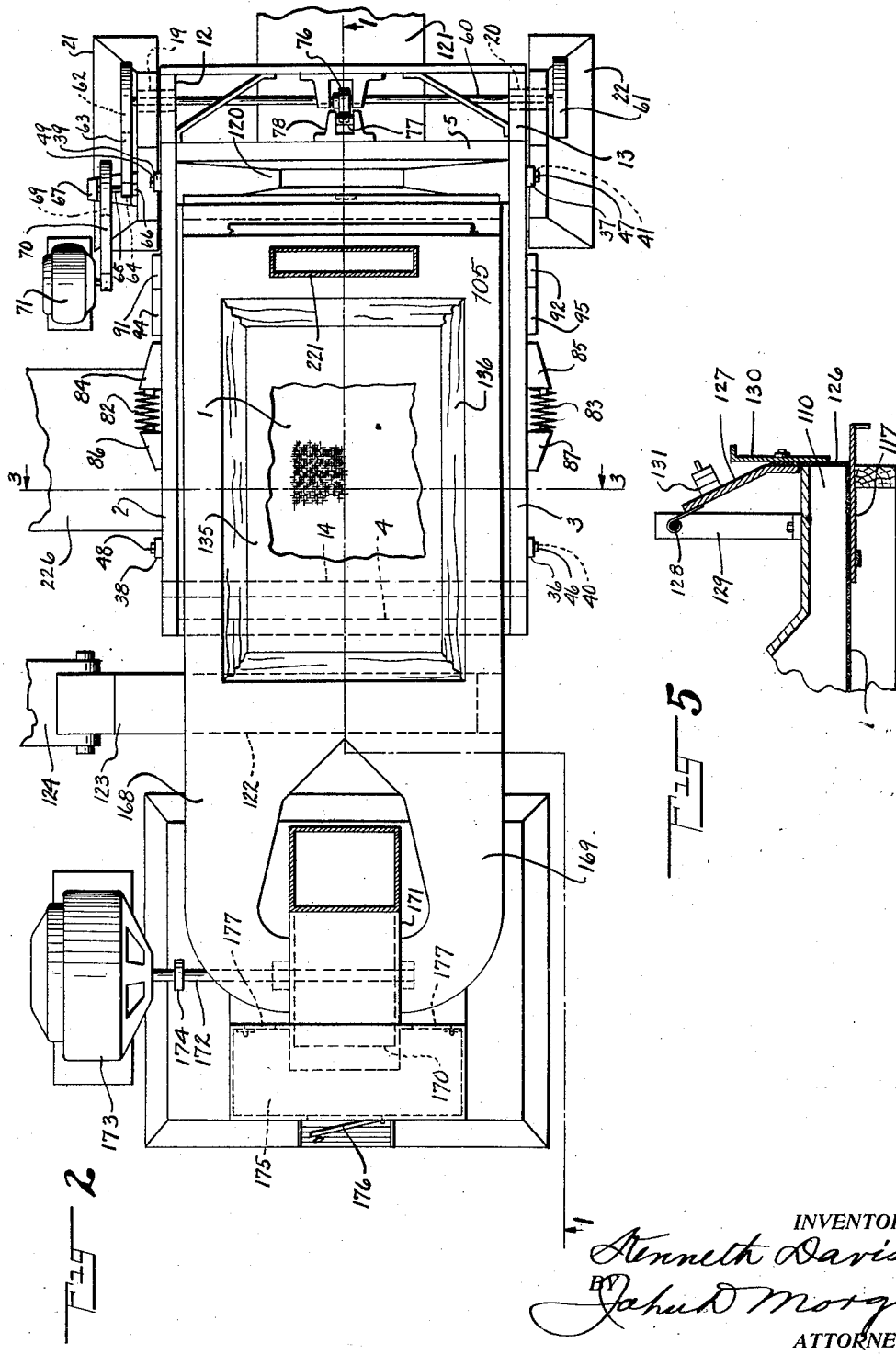

April 7, 1931.  K. DAVIS  1,799,289
MECHANISM AND METHOD FOR SEPARATING INTERMIXED DIVIDED MATERIALS
Original Filed March 30, 1923  3 Sheets-Sheet 3
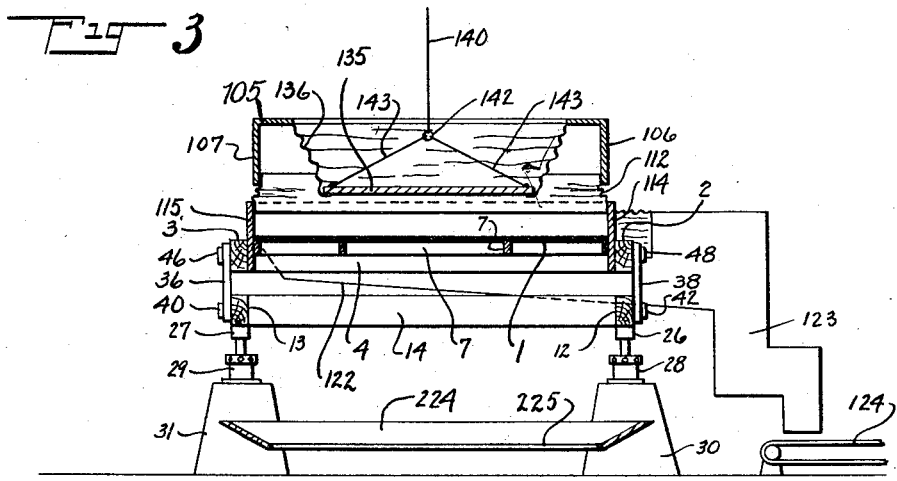
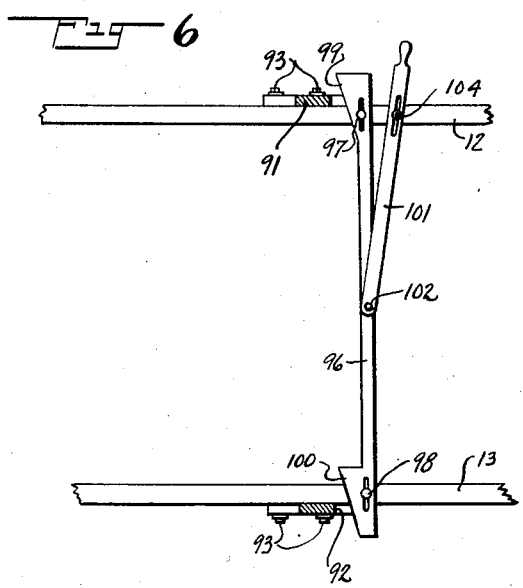
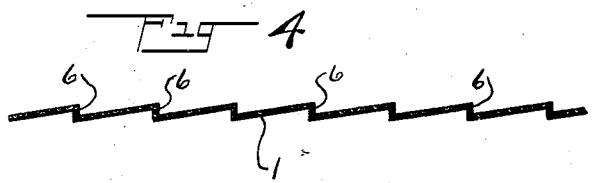
INVENTOR
Kenneth Davis
BY John D. Morgan
ATTORNEY Patented Apr. 7, 1931

1,799,289

UNITED STATES PATENT OFFICE

KENNETH DAVIS, OF EBENSBURG, PENNSYLVANIA, ASSIGNOR TO REMBRANDT PEALE, RICHARD PEALE, AND REMBRANDT PEALE, JUNIOR, TRUSTEES

MECHANISM AND METHOD FOR SEPARATING INTERMIXED DIVIDED MATERIALS

Application filed March 30, 1923, Serial No. 628,922. Renewed December 12, 1928.

The invention relates to a process and mechanism for separating intermixed divided materials of different specific gravities, and more especially to such a process and mechanism effecting the separation by the concurrent action of air pressure and mechanical motion combined in a novel and unusually efficient manner.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a partial elevation and a partial central vertical section, taken substantially on line 1—1 of Fig. 2, of a mechanism embodying the invention;

Fig. 2 is a top plan with some parts in horizontal section; taken substantially on line 2—2 of Fig. 1;

Fig. 3 is a transverse vertical section, taken substantially on line 3—3 of Fig. 2;

Fig. 4 is a sectional, enlarged, fragmentary detail of one form of the bed or table of the separating mechanism;

Fig. 5 is an enlarged vertical sectional detail of a modified form of the discharge device for the heavier separated material, and Fig. 6 is a fragmentary detail, partly in section on line 6—6 of Fig. 1, of the mechanism for regulating the reciprocatory travel and impact of the separating bed.

The process and mechanism of the invention are directed to effecting a thorough, rapid, facile and efficient separation of intermixed, divided materials of different specific gravities, and the separated delivery of the separated materials; and in certain aspects of the invention it is especially directed to the separation of coal from the intermingled rock and "bone" or "bony" (a material of very high ash content and consequent low heating properties) as they come from the mine.

The term "divided" will be understood as applying very generally to materials in relatively small parts or particles, or of small size, as contrasted with material with relatively large bulk or in relatively large masses or pieces, and the term will apply to granular, broken, pulverulent or otherwise divided materials in so far as the invention is applicable thereto. The intermixture of coal, rock and bony already referred to is an example of such divided and intermixed materials.

The present invention is also directed to effecting such a thorough, rapid, facile and otherwise efficient separation of the intermixed materials without requiring the usual very slow, laborious and costly preliminary "sizing" of the intermixed materials, such for instance as the "run of the mine" mixture of coal, rock and bony.

The usual "sizing" consists in screening or otherwise separating the materials, while still intermixed, to practically uniform size, within a range of from half-an-inch down by close graduations to one-thirtieth of an inch or less, and even much smaller sizes, preliminary to separating. In the usual practice in separating or cleaning coal, the sizing is effected within these vary small ranges of size, thus involving very extensive, tedious and expensive preliminary work thereon.

The present invention, on the other hand, will rapidly, thoroughly, easily and efficaciously separate the intermixed materials including a very wide range of sizes. In practice, I have found that a table will take care of all sizes from two-and-one-half inches down to the minimum, but it will be understood, that this is merely a statement of present practical experience, and is in no wise restrictive of the invention. The main fact is that the machines of this invention dispenses entirely or practically entirely with the costly, time-consuming and otherwise objectionable operation of "sizing".

The present preferred embodiment comprises, as its general features, an air-pervious support or table for receiving a mass or layer of the intermixed divided materials, the table being upwardly and forwardly inclined, and the intermixed materials being fed to the forward (so termed for convenience) end of the table in regulable quantities, so as to maintain the desired or required layer or mass of materials in process of separation upon the table.

The table is vibrated, or reciprocated with a very short amplitude, preferably in the general plane or direction of the table or support, and terminating in a sharp impact. Preferably the movement is a quick, sharp movement, slightly upwardly and forwardly, terminating in the impact, and a relatively slow backward and downward return movement.

The air is drawn upwardly through the table and it is also regulably directed backwardly and laterally or transversely as it passes through the upper or lighter stratified, or stratifying and floated, or partially floated, lighter material, so as to expedite and facilitate the separation, and especially the discharge or delivery of the lighter material.

The air current is more especially directed primarily upwardly through the bottom of the stratifying material, which is composed entirely or mainly of the heavier material, and then is directed strongly rearwardly through the upper part of the stratifying or stratified material, thus impelling the lighter material strongly and rapidly toward the rear end, which is its place of discharge.

Other features of the invention, both structural and functional, will be primarily disclosed in connection with the following detailed description, but it will be understood that both the foregoing general description and the following detailed description are exemplary and explanatory but are not restrictive of the invention.

So far as concerns certain features of the invention, the particular form of the separating table and cooperating parts is immaterial.

Referring now in detail to the embodiment of the invention illustrated by way of example in the accompanying drawings, a separating table or support 1 for a mass of material to be separated is provided, consisting of foraminate or otherwise air-pervious material, such as woven wire, perforate metal plate or other suitable material. The table is preferably upwardly and forwardly inclined and its surface may be flat or plane as shown in Fig. 1, but is preferably provided with transversely disposed projections 6, as shown in Fig. 4, extending preferably entirely across the table. These projections may be formed by strips or other members fixed to the upper surface of the table 1, or the table 1 may be constructed so that it will form or constitute such transverse ridges, an example of such construction being shown in Fig. 4. The construction is such that when the table moves forwardly, the material resting thereon will be carried with it, but when the table moves backwardly the material will slide forwardly along the table by reason of its inertia.

Means are provided for imparting vibratory motion, or reciprocation in a path of very short amplitude, to the table 1. This motion is preferably a short and sharp motion upwardly and forwardly, terminating in a sharp impact, and a relatively slow backward and downward return movement.

As embodied, the air-pervious table 1 is supported on a frame, which may be conveniently termed the vibratable or reciprocatory frame, this frame having side reaches 2 and 3 and a rear cross reach 4 and a forward cross reach 5. Cross strips 7 are also provided for supporting the table 1 at intervals therebeneath. The reciprocable frame just described is supported on a frame which is variably or regulably inclinable lengthwise of the table, but is otherwise stationary, that is, it does not participate in the vibratory or reciprocatory movement just described. This frame has side reaches 12 and 13 and a rear cross reach 14 and a forward cross reach 15.

This stationary or non-reciprocable frame is mounted to permit the variable or regulable longitudinal positioning of the frame. As embodied, it is pivotally supported at its forward end by hollow trunnions 19 and 20, projecting outwardly therefrom and journaled respectively in supports 21 and 22, arranged at either side thereof. Approximately adjacent to each of the rear corners of the stationary frame it is provided with socketed bearings 26 and 27, respectively, which rest upon jack screws 28 and 29, which in turn are carried upon supports 30 and 31. By means of the jack screws the longitudinal inclination of the stationary table and therewith of the reciprocable table may be regulated as desired.

The embodied form of means for effecting the vibratory or reciprocatory movement comprises four or more links 36, 37, 38 and 39, pivoted respectively at 40, 41, 42 and 43 near the four corners of the non-reciprocable frame, and correspondingly pivoted at 46, 47, 48 and 49 to the reciprocable frame, approximately adjacent to the corners thereof. Journaled in the forward part of the stationary frame, and shown journaled in the hollow trunnions 19 and 20, is a shaft 60. This shaft is provided at one end thereof, preferably, with a fly wheel 61 and at the other end with a belt pulley 62.

A belt 63 runs over this pulley and over a reduction pulley 64, fixed on a shaft 65, which shaft is journaled at 66 and 67 in supports mounted upon the member 21. Fixed also to shaft 65 is a belt pulley 69, carrying a belt 70 which runs also over a pulley on the shaft of a motor 71. Fixed on shaft 60 is a cam 76, with which cooperates a cam roller 77, mounted in a bracket 78, which bracket is fixed upon the front reach 5 of the reciprocable frame. At either side of the mechanism, respectively, springs 82 and 83 are in compression between lugs 84 and 85, fixed on the reciprocable frame, and corresponding lugs 86 and 87, fixed respectively on the stationary or non-reciprocable frame.

In the embodied form of stop mechanism, means are provided at either side of the frame, for variably and uniformly regulating the amplitude of vibration or reciprocation. As embodied, two stop plates 91 and 92 are mounted on the respective side reaches 12 and 13 of the stationary frame by bolt-and-slot connections 93, whereby the stops may be slid along and be locked in position along the frame. The lugs 94 and 95 are positioned to impact against the rear faces of these stops at the end of the forward and upward movement of the reciprocable frame.

Means are provided, as indicated, for regulating uniformly the positioning of the stops 91 and 92, and as embodied (Figs. 1 and 6) a bar 96 is disposed across and rests upon the stationary frame, and is longitudinally slidably mounted thereupon by means of bolt-and-slot connections 97 and 98. This bar is provided with beveled portions 99 and 100, and is movable longitudinally by suitable means, there being provided for this purpose a handle 101, pivotally connected to the bar 96 at 102, and having a bolt-and-slot slidable connection 104 on the top of the frame piece 12. The stops 91 and 92 are positioned in alinement against the beveled parts 99 and 100 of the bar 96, and then the bolts 93 are screwed home to hold the stops in position. The bar also serves to prevent any give or slip in the stops.

When the roller 77 rides upon the rise of the cam 76, the separating mechanism will be moved relatively slowly downwardly and backwardly, and the springs 82 and 83 will be put under increased compression. When the roller 77 rides off the high part of the cam 76, the separating mechanism will be moved upwardly and forwardly, quickly and sharply, and will receive a sharp impact against the stops 91 and 92.

Means are provided for drawing the air upwardly through the bed or pile of materials undergoing separation, and also for regulably directing the air current, especially in the upper part of the layer or pile of material where the lighter material has been floated and stratified and thereby separated.

As embodied, a general casing or air chamber structure is provided above and overhanging the separating mechanism proper. This air chamber 103 comprises a top plate 105, having a large central opening therein over the separating table, and having downwardly depending side walls 106 and 107, a front wall 108' and a rear wall 109. This is provided with an air-tight connection with the separating mechanism by means of a flexible air-tight member 108, such as canvas or other air-tight fabric, connecting the lower edges of the side and end walls of the chamber with the top edges of the sides and ends of the table, and those of a discharge chute to be later described.

As previously stated, this separating mechanism is designed to discharge the separated coal or other lighter material at the rear end thereof, and the separated rock or other heavier material at the forward end thereof. In the embodied form of discharge means, a passageway 110 discharges the rock at the forward end. This passageway, if desired, may be regulable as to its discharge area by any suitable means.

The discharge opening has a top plate 113 constituting the top of the passageway 110, and connecting from the side wall 114 on one side of the side wall 115 on the other side of the separating table. A slide 117 is preferably provided beneath the forward end of the passageway to regulate the air-pressure action up through the bottom of the passageway 110. This passageway may also be provided with an air-pressure regulating gate.

In Fig. 5 a form of gate is provided having an air-pervious closure 126 for the end of the discharge passage, carried on a hanger 127, pivotally supported on a rod 128, mounted in standards 129. A slide 130 may be used to regulate the amount of air suction through the air-pervious gate 126. Also removable weights 131 may be used to regulate the pressure at which the discharging rock will open the gate against the air suction. A chute 120 receives the discharged rock or other heavier material and delivers it to a conveyor belt 121.

A lighter material, such as the coal, is conveyed away from the rear end likewise by suitable means, and as embodied, a chute 122 is arranged across the rear end of the separating table and is inclined downwardly to the right in Fig. 3. This chute is provided with air-locking means, and for this purpose it has a double angle or elbow portion 123 therein, designed to retain sufficient coal or other material at this point to form an air seal while at the same time permitting the coal to be discharged from the chute onto a conveyor belt 124 which conveys it away. An air-tight connection 125 is provided between the inner edge of the chute and the reciprocating frame.

In the embodied form of means for regulating and directing the air current, a plate 135 is provided, overhanging the separating table and extending over the greater part of its area. However, the relative size of this plate with respect to the separating table may be varied as desired. That is, it may be longer or shorter than in Fig. 1, and wider and narrower than in Fig. 3, as may be found desirable or most efficient with particular materials and under particular conditions of separation. This air-regulating plate 135 has a flexible air-tight connection, consisting of a sheet of canvas, or other air-tight material 136, connected to the edges of the plate and to the inner edges of the top plate 105 of the air chamber.

Means are provided for raising and lowering the plate 135, and also for inclining it either longitudinally or transversely. In the embodied form thereof, cables 140 and 141 are connected by rings or thimbles 142 to supporting lines 143 and 144, extending across and fastened at each end to the plate 135. These cables, respectively, are wound about drums 147 and 148, which are journaled in bearings 149 and 150, respectively, carried upon a frame member 151. The free ends of the respective cables are attached to suspended weights 152 and 153. On the shafts of the two drums, respectively, are pulleys 154 and 155, provided with corresponding chains 156 and 157. Thus by slipping the rings 142 along the lines 143 and 144 the plate 135 may be variably inclined transversely, and by the drums 147 and 148 the plate may be inclined longitudinally in either direction or it may be moved toward or away from the separating table substantially parallel thereto.

Means are provided for creating the air current and also for collecting the dust and small particles of coal or other lighter material sucked upwardly and outwardly with the air currents. In the embodied form thereof, the air chamber 103 at its rear end terminates in two rearwardly extending air-passages 168 and 169, which communicate at either side with the intake ports of a fan 170 in a casing 171. The shaft 172 of the fan is connected to a motor 173, and is preferably provided with a friction disk coupling 174, or other such suitable device. An air-lock chamber 175 is preferably provided for giving access to the fan for oiling or adjustment while it is running. This chamber is provided with doorways 176 and 177, and the attendant may step in through the door 176 and close it, and thereafter open the doors 177 to have access to the fan without disturbing the air system.

The air current discharged from the fan passes into an enlarged chamber, whereby the velocity thereof is very greatly reduced, and the dust and fine particles of material thereby separated and dejected. As shown, the fan discharges into the lower part of this air chamber which has outwardly and upwardly inclined walls 180 and 181 and preferably an upper part having vertically disposed walls 182, the air being discharged therefrom into the outer air.

There are preferably provided within the chamber baffle plates 183, which also serve to separate and deject the dust and fine particles and direct them toward the place of discharge. The rear end of the air chamber has a rearwardly and downwardly inclined floor 184, the baffle plates 183 being disposed in proper relation thereto to throw the separated particles thereonto. This part of the chamber is provided at its rear and bottom end with a gate or door 185, emptying into a chute 186, carried on supports 187 and 188. This chute discharges onto a conveyor belt 189.

Means are also provided for regulably feeding the intermixed materials to the separating mechanism at such rate as to maintain the bed or pile of materials upon the separating table in desired condition, that is, so that the rate of feed may be practically the same as the rate of separation and discharge of the material. As embodied, a chute 201, located at the front of the mechanism, has a front wall 202 and side walls 203 inwardly and downwardly inclined and a straight rear wall 204. The bottom of the chute terminates in a discharge orifice 205 which is made larger or smaller by a slide gate 206, working in a guideway 207 upon the hopper frame.

In the bottom of the hopper is a horizontally disposed, reciprocating slide 210, running between friction rollers 213. This slide is connected by a pivoted link 214 to a crank disk 215, the shaft of which is journaled on a support 217. Fixed on this shaft is a worm wheel 218, meshing with a worm 219, fixed on the shaft of the motor 220. The material is discharged from the hopper into a chute 221, which delivers it at the desired place upon the separating table. It will thus be seen that by regulating the slide 206 the supply of material may be very nicely regulated.

Means are preferably provided for gathering up the dust which may fall beneath the separating table and for this purpose a receptacle 224 is provided having its sides inclined inwardly and downwardly, and an opening 225 at the bottom located over a conveyor belt 226, upon which the material is discharged.

The manner of operation of the mechanism hereinbefore described will be understood from the foregoing description, but may be briefly summarized to be substantially as follows:—

The intermixed divided materials are fed downwardly through the hopper 221 in sufficient volume or quantity so as to keep the bed or pile of material in the desired condition and size or quantity upon the bed; that is, the intermixed materials will be fed thereto at the rate or capacity of the mechanism for separating and discharging the separated materials.

In the present invention the air is drawn upwardly through the material, and the air currents are then drawn through the air chamber and through the fan, and are finally expanded and thereby retarded, which expansion together with the action of the baffles separates and dejects the dust and particles of materials which have been suspended in the air current. With most intermixed materials, the air pressure will be made strongest at the upper and forward part of the table and will be decreased downwardly and backwardly gradually toward the rear end thereof.

Due to the action of the air currents, most of the stratification and separation is effected in the pile almost immediately after the material comes upon the table or bed 1 from the hopper 221. This is especially true as to the larger pieces of the heavier material, which come to rest immediately upon the bed 1, and as to the smaller pieces of the lighter material, which are floated immediately into the upper part of the pile or mass of material. The heavier material, resting upon the bed 1, is immediately impelled strongly forwardly by its own inertia and the mechanical movement of the table, while the lighter the floatant material is swept rearwardly by the air current toward the place of discharge of the lighter material.

Usually the smaller pieces of the heavier material and the larger pieces of the lighter material are probably not so rapidly separated, but many of the smaller pieces of the heavier material may be floated to some extent or for some time by the stronger air currents at the forward end of the tables, and will thus be carried some distance rearwardly along the table or bed 1. As they pass into the regions of less powerful air currents, these pieces of heavier material will come to rest on the bed 1, and will then be impelled forwardly mechanically as already described to the place of discharge for the heavier material.

As these particles come again into a region of stronger air currents they will not be again lifted or buoyed thereby for the reason that they are now beneath the entire mass of material and are being impelled along the surface of the bed in the stream of rock or other heavier material. Thus, the process of separation progresses gradually more and more as between the smaller pieces of heavier material and the larger pieces of lighter material until before the rear of the bed 1 is reached, all of the rock or other heavier materal will have come to rest thereon and will be mechanically impelled forwardly thereby along to a place of discharge.

The lighter material, such as the coal, will be carried by the air action to the rear of the table and discharge into the chute 122. While the air action or the direction of the air currents, through the lower part of the mass is substantially vertical or possibly perpendicular to the bed 1, as the air is drawn upward the plate 135 together with the suction of the fan deflects it toward the horizontal and toward the rear of the bed, and the floatant pieces of lighter material are rapidly swept to the rear and into the chute 122, thus expediting the separation and the discharge of the lighter material and increasing the capacity of the machine. The direction and intensity of the action of the air currents is varied or regulated by positioning the plate 135, either by moving it toward or from the bed 1 or inclining it longitudinally or transversely.

It will be understood also that the invention is not limited by the statements of theory of operation set forth herein, but such statements are the results of my observation of the practical operation of the mechanism and the present conclusions which I have drawn from such observations.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for separating intermixed divided materials, comprising in combination an inclined air pervious table, means for rapidly vibrating the table longitudinally and terminating the up stroke by impact, means for flowing air upwardly through the table, whereby the materials are stratified and caused to move in different directions, and an air deflecting plate positioned immediately above the upper stratum of lighter material for directing the upwardly flowing air laterally and downwardly toward the lower end of the table, such deflected air acting to move the upper stratum toward the lower end of the table.

2. A mechanism for separating intermixed divided materials, comprising in combination an inclined air pervious table, means for rapidly vibrating the table longitudinally and terminating the up stroke by impact, means for flowing air upwardly through the table, whereby the materials are stratified and caused to move in different directions, an air deflecting plate positioned immediately above the upper stratum of lighter material for directing the upwardly flowing air laterally and downwardly toward the lower end of the table, such deflected air acting to move the upper stratum toward the lower end of the table and means for feeding the intermixed materials onto the upper end of the table near the upper end of the air deflecting plate.

3. A mechanism for separating intermixed divided materials, comprising in combination an inclined air pervious table, means for varying the inclination of the table, means for rapidly vibrating the table longitudinally and terminating the up stroke by impact, means for flowing air upwardly through the table, whereby the materials are stratified and caused to move in different directions, and an air deflecting plate positioned immediately above the upper stratum of lighter material for directing the upwardly flowing air laterally and downwardly toward the lower end of the table, such deflected air acting to move the upper stratum toward the lower end of the table.

4. A mechanism for separating intermixed divided materials, comprising in combination an inclined air pervious table, means for rapidly vibrating the table longitudinally and terminating the up stroke by impact, means for regulating the amplitude of vibration of the table, means for flowing air upwardly through the table, whereby the materials are stratified and caused to move in different directions, and an air deflecting plate positioned immediately above the upper stratum of lighter material for directing the upwardly flowing air laterally and downwardly toward the lower end of the table, such deflected air acting to move the upper stratum toward the lower end of the table.

5. A mechanism for separating intermixed divided materials, comprising in combination an inclined air pervious table, means for rapidly vibrating the table longitudinally and terminating the up stroke by impact, means for flowing air upwardly through the table, whereby the materials are stratified and caused to move in different directions, transversely extending projections on the table for aiding the movement of the lower stratum, and an air deflecting plate positioned immediately above the upper stratum of lighter material for directing the upwardly flowing air laterally and downwardly toward the lower end of the table, such deflected air acting to move the upper stratum toward the lower end of the table.

6. A mechanism for separating intermixed divided materials, comprising in combination an inclined air pervious table, means for vibrating the table longitudinally thereof, means for regulating the amplitude of the vibration and terminating the up stroke by impact, means for flowing air upwardly through the table, the vibration and air currents causing the materials to stratify, means for discharging the heavier materials in the lower stratum at the upper end of the table, means for discharging the lighter materials in the upper stratum at the lower end of the table, and means for feeding the intermixed materials onto the table near the upper end thereof.

7. A mechanism for separating intermixed divided materials, comprising in combination an inclined air pervious table, means for vibrating the table longitudinally thereof, means for terminating the up stroke of the table by impact, means for flowing air upwardly through the table, the vibration and the air currents causing the materials to stratify, transversely extending projections on the table for causing the lower stratum to travel upwardly of the table, means for regulably feeding intermixed materials onto the table, and an air deflecting plate positioned immediately above the upper stratum for directing the upwardly flowing air laterally and downwardly toward the lower end of the table, such deflected air acting to move the upper stratum toward the lower end of the table.

8. The method of separating intermixed divided materials which comprises stratifying the materials in an inclined bed by means of vibration and upwardly flowing currents of air, and deflecting the upwardly flowing air as it leaves the upper stratum laterally toward the lower end of the table, the vibration and the laterally flowing air acting, respectively, to move the lower stratum to the upper end of the table for discharge, and to move the upper stratum to the lower end of the table for discharge.

9. The method of separating intermixed divided materials which comprises stratifying the materials in an inclined bed by means of vibration and upwardly flowing currents of air, feeding the intermixed materials onto the upper end of the table, and deflecting the upwardly flowing air as it leaves the upper stratum laterally toward the lower end of the table, the vibration and the laterally flowing air acting, respectively, to move the lower stratum to the upper end of the table for discharge, and to move the upper stratum to the lower end of the table for discharge.

10. The method of separating intermixed divided materials which comprises stratifying the materials in an inclined bed by means of vibration and upwardly flowing currents of of air, the up stroke of the vibration terminating in an impact, and deflecting the upwardly flowing air as it leaves the upper stratum laterally toward the lower end of the table, the vibration and the laterally flowing air acting, respectively, to move the lower stratum to the upper end of the table for discharge, and to move the upper stratum to the lower end of the table for discharge.

11. The method of separating intermixed divided materials which comprises stratifying the materials in an inclined bed by means of vibration and upwardly flowing currents of air, the up stroke of the vibration terminating in an impact, feeding the intermixed materials onto the upper end of the table and deflecting the upwardly flowing air as it leaves the upper stratum laterally toward the lower end of the table, the vibration and the laterally flowing air acting, respectively, to move the lower stratum to the upper end of the table for discharge, and to move the upper stratum to the lower end of the table for discharge.

12. In a mechanism for separating intermixed divided materials in combination, an air-pervious table, means for maintaining thereon a bed of materials of substantial depth, means for reciprocating the table to progress the materials therealong, means for passing lifting and loosening air currents through the bed, and means for directing a sheet of air over the table surface and substantially parallel thereto to move the lighter material over the heavier material and to a place of discharge, the direction of flow of the air being toward said place of discharge, and means for discharging heavier material from the edge of the table at the level of the table surface.

In testimony whereof, I have signed my name to this specification.

KENNETH DAVIS.